UNITED STATES PATENT OFFICE.

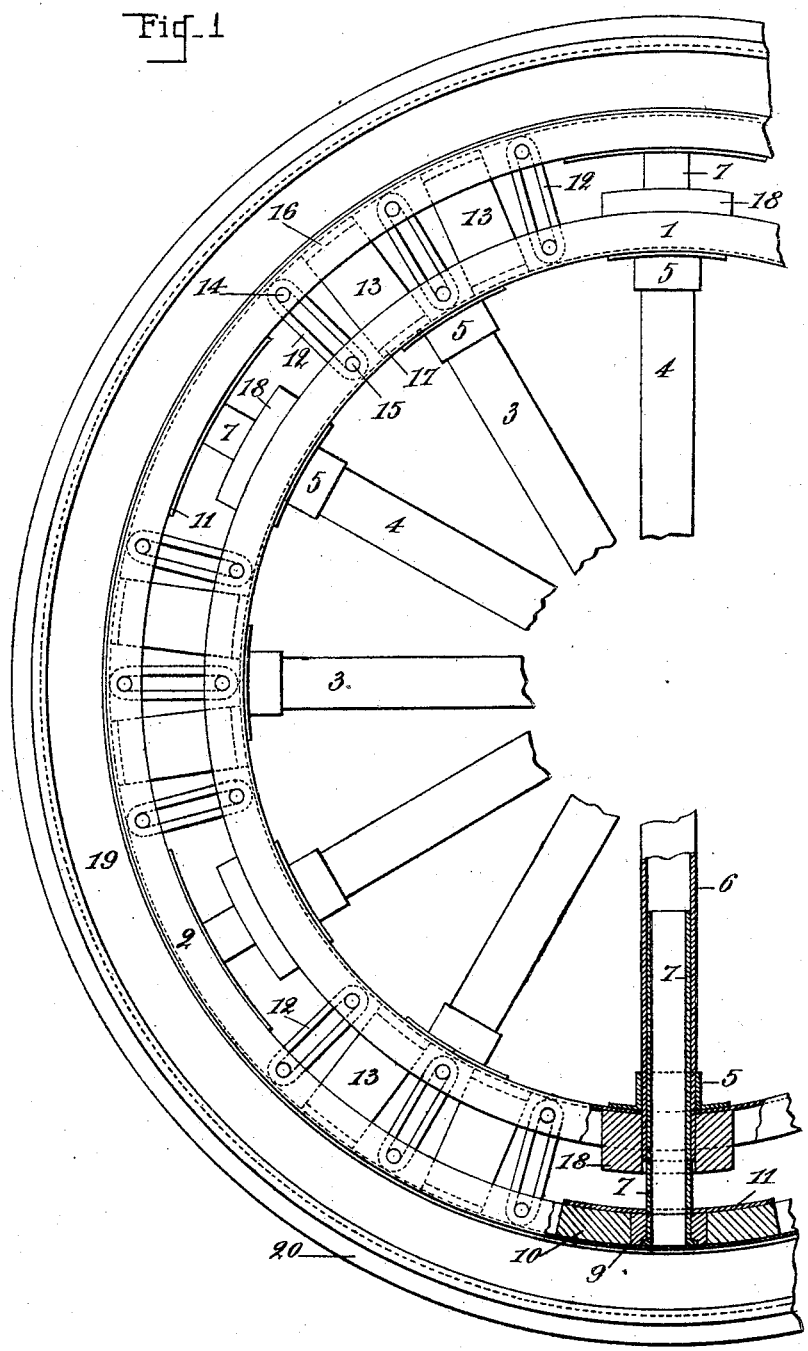

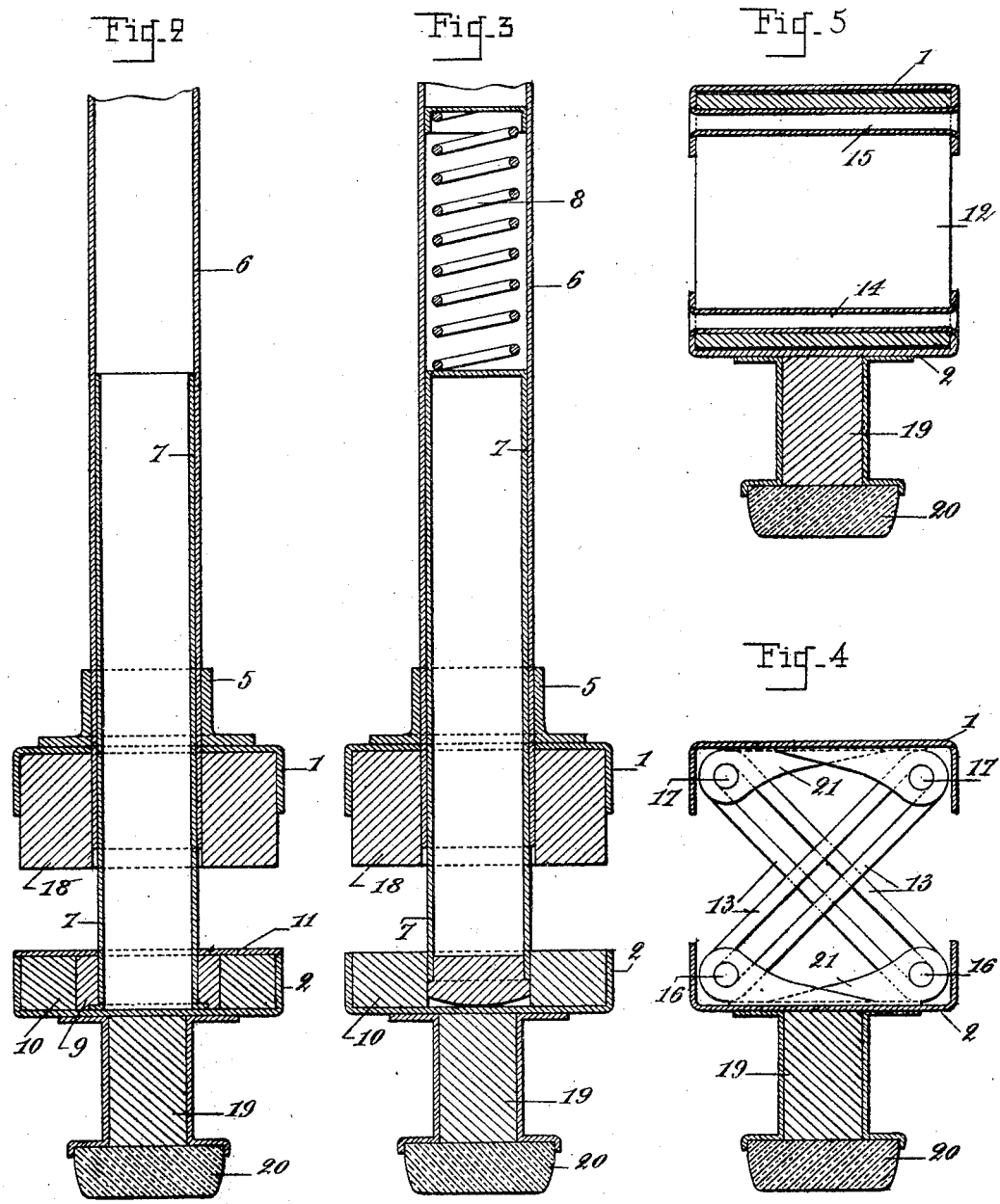

RAOUL BERNAT, OF BORDEAUX, FRANCE.

RESILIENT WHEEL.

No. 796,625.        Specification of Letters Patent.        Patented Aug. 8, 1905.

Application filed November 28, 1904. Serial No. 234,644.

*To all whom it may concern:*

Be it known that I, RAOUL BERNAT, a citizen of France, residing at Bordeaux, France, have invented new and useful Improvements in and Connected with Resilient Wheels, (for which I have obtained a patent in France, No. 341,323, bearing date March 1, 1904, to which corresponds a patent of addition of October 11, 1904,) of which the following is a specification.

This invention has for its object a system of resilient wheel applicable to all kinds of vehicles, which enables the vibrations caused by the inequalities of the ground to be overcome, producing a running of a smoothness superior to the running of pneumatic tires without having the drawbacks of the latter.

According to the system of wheel forming the object of the present invention the wheel is substantially composed of two normally concentric rims interconnected by rings of india-rubber stretched over pins and working under tension. The external rim must be held in the plane of the internal rim without any lateral displacement; but the two rims are always capable of being eccentrically displaced more or less relatively to one another, according to the inequalities of the ground.

The accompanying drawings show, as an example, the method of carrying out the system forming the object of the invention in the particular case where this system is to be applied to a heavy and rapid traveling vehicle. Of course this method or arrangement may be varied in its details, according to the weight of the vehicle, its speed, and its method of traction, the lateral displacement of the external rim being according to the case more or less to be feared.

In the drawings in question, Figure 1 is an elevation and partial section of a half-view of the wheel as a whole. Fig. 2 is a section, on an enlarged scale, of the system of guide-tubes and tubular spokes, forming a slide and insuring the correct guiding of the external rim. Fig. 3 is a similar view showing the arrangement of the guide-tube maintained pressed against the exterior rim by a spiral spring placed in the spoke-tube. Figs. 4 and 5 are sections on a larger scale, showing the method of arranging the elastic rings connecting the two rims of the wheel.

In the system forming the object of the present invention each wheel comprises two rims of equal width—an internal one 1 and an external one 2. The rim 1 is connected to the hub (which is not shown in the drawings) by spokes 3 and 4. The spokes 3 are mounted in the ordinary manner, and the spokes 4, which are intercalated between the spokes 3, are constituted in a special manner, which will be hereinafter explained. All the spokes are fixed by means of sockets 5 on the rim 1.

Each spoke 4 consists, first, of a tube 6 of any suitable section fixed in the socket 5 and passing through the rim 1, beyond which it projects to a certain extent. In the interior of the tube 6 another tube 7 of similar section to the tube 6 slides with slight friction, forming a guide. The extremity of the tube 7 is in contact with the rim 2, and this contact may be obtained either by means of a spiral spring 8, Fig. 3, placed in the tube 6 and pressing the tube 7 outward, or, preferably, by arranging at the extremity of the tube 7 a collar 9, imprisoned in a groove formed in the interior of the rim 2. In both cases the extremities of the tube 7 in contact with the rim 2 are maintained laterally between slides 10, forming a groove the width of which is equal to the diameter of the tubes 7 or the collars 9. These slides are fixed longitudinally on the interior of the rim 2 and partially covered by plates 11, which inclose the collars 9 and only leave free the passages of the tubes 7. The slides formed by the combination of the tubes 6 and 7 enable the rim 2 to move up and down or forward and backward for a distance equal to the difference in the diameter of the rims 1 and 2, while preventing any lateral displacement of this latter.

In order to obtain resiliency, the rims are interconnected by india-rubber rings 12 and 13, stretched, respectively, over two pins 14 15 and 16 17, fixed, respectively, on the rim 1 and on the rim 2.

The pins 14 and 15, carrying the series of rings 12, Fig. 5, are arranged parallel to the axis of the hub, which arrangement is of great importance, because is suffices to considerably attenuate, independently of the guides constituted by the tubes 6 and 7, the lateral displacement of the rim 2. The pins 16 and 17, carrying the series of rings 13, are arranged between the rims and parallel to the plane of these latter, so that the oblique rings 13 are alternated symmetrically, Fig. 4—that is to say, in considering a wheel in profile, if one of the rings 13 be fixed from the right of the rim 1 to the left of the rim 2 the succeeding oblique ring will be fixed from the left of the rim 1 to the right of the rim 2. This arrangement insures the centering of the external rim. The rings 12 and 13 are preferably mounted on their pins with a certain tension in order to thus attenuate the lateral displacement of the rim 2.

In case the compression in the bottom of the rims is frequent—for instance, in the case of a very heavy vehicle or one traveling on bad roads—the rims may be provided with india-rubber buffers 18, forming supplementary antivibrators.

Preferably the rims 1 and 2 may be formed of a ring of sheet-steel bent in a U form, the sides of which face one another, the rim 2 being also strengthened by an external belt 19, carrying the india-rubber tread 20.

The pins 14, 15, 16, and 17 may be provided at each of their ends with a piece 21 of suitable form, fixed solidly on each rim by any suitable means. The pins may also, and particularly in the case of pins which are parallel to the hub, consist of steel rods or tubes passing through holes bored in the sides of the rims and bolted or riveted on the latter.

The system of guiding hereinbefore described and obtained by means of guide-tubes sliding in the spoke-tubes of the rim 1 may also be arranged in one or other of the two following ways, presenting solely some differences of detail over the one which has been hereinbefore described: Each of the tubes may be fixed and hinged by one of its ends—the tube 6 between two spokes near the hub and the tube 7, which slides in the tube 6, on the external rim. At the passage of the tube the internal rim 1 has an aperture equal in width to that of the tube which is guided in this passage and of sufficient length to allow play to the external rim. The tube 6 may also be pivoted on the internal rim 1 itself by means of two trunnions—the tube 7, pivoted on the external rim 2, slides in the former, which for this purpose is of sufficient length.

The wheel hereinbefore described is adapted for heavy rapid-traveling vehicles, necessitating an exact guidance of the external rim. For lighter or slower vehicles or for vehicles drawn by animals, however, the guide-tubes may be dispensed with, and either merely india-rubber rings, such as 12, or rings such as 13, or a combination of the two, may suffice.

I declare that what I claim is—

1. A system of resilient wheel comprising an internal rim, fixed on the hub of the wheel, and an external rim bearing the tread or running surface, said rims being maintained normally concentric and in the same plane by means of endless rubber bands secured to the rims, each of said bands being placed with its width at right angles to the width of the adjacent bands, the tension of said bands tending to constantly return the external rim into the plane and on the axis of the internal rim, substantially as described.

2. A system of resilient wheel comprising an internal rim fixed on the hub of the wheel by rigid spokes arranged in the ordinary manner, and an external rim connected to the former by two series of resilient elements working under tension when the two rims are rendered eccentric under the action of the weight of the vehicle, the first series of said elements being constituted by elastic rings stretched in the direction of the spokes of the wheel, and fixed on pins respectively attached to each of the rims and at right angles to the plane of the fixed rim, and the second series of said elements being constituted by elastic rings stretched in oblique planes relative to the plane of the fixed rim and alternately inclined symmetrically in one direction or the other on this latter, the said rings being fixed on pins respectively attached to each of the two rims and parallel to the plane of these latter, substantially as described.

3. A system of resilient wheel comprising an internal rim fixed on the hub, and an external rim carrying the tread; endless rubber bands fixed on the said rims, each of said bands being placed with its width at right angles to the width of the adjacent bands, said bands being stretched so as to constantly return the external rim into the plane and on the axis of the internal rim, sliding spokes constituted by two tubes sliding one in the other and respectively attached to each of the two rims, so as to avoid any lateral displacement of the external rim in its movement, and constantly maintaining it in the plane of the interior rim, and resilient plugs or studs, arranged on the periphery of the internal rim in order to prevent the external rim from bearing directly on this latter, substantially as described.

In testimony whereof I have signed my name to this specification in the presence of two subscribing witnesses.

RAOUL BERNAT.

Witnesses:
PAUL AUGIÉRE,
GEORGES GAUVEAU.